(12) United States Patent
Shinozuka et al.

(10) Patent No.: US 10,664,193 B2
(45) Date of Patent: May 26, 2020

(54) STORAGE SYSTEM FOR IMPROVED EFFICIENCY OF PARITY GENERATION AND MINIMIZED PROCESSOR LOAD

(71) Applicant: Hitachi, Ltd., Chiyoda-ku, Tokyo (JP)

(72) Inventors: Kenta Shinozuka, Tokyo (JP); Takahiko Takeda, Tokyo (JP); Isamu Kurokawa, Tokyo (JP); Sho Sawada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 79 days.

(21) Appl. No.: 16/084,916

(22) PCT Filed: Sep. 16, 2016

(86) PCT No.: PCT/JP2016/077533
§ 371 (c)(1),
(2) Date: Sep. 13, 2018

(87) PCT Pub. No.: WO2018/051505
PCT Pub. Date: Mar. 22, 2018

(65) Prior Publication Data
US 2019/0087122 A1 Mar. 21, 2019

(51) Int. Cl.
*G06F 3/06* (2006.01)
*G06F 11/10* (2006.01)

(52) U.S. Cl.
CPC ............ *G06F 3/0658* (2013.01); *G06F 3/061* (2013.01); *G06F 3/064* (2013.01); *G06F 3/0619* (2013.01);
(Continued)

(58) Field of Classification Search
CPC ...... G06F 3/0658; G06F 3/061; G06F 3/0619; G06F 3/064; G06F 3/0659; G06F 3/0673;
(Continued)

(56) References Cited

U.S. PATENT DOCUMENTS 5,533,190 A * 7/1996 Binford ............... G06F 11/1084
714/6.21
6,112,255 A * 8/2000 Dunn .................. G06F 11/1076
710/52

(Continued)

FOREIGN PATENT DOCUMENTS

JP   2015-518186 A    6/2015
WO   2013/160970 A1  10/2013
(Continued)

*Primary Examiner* — Ryan Bertram
(74) *Attorney, Agent, or Firm* — Procopio, Cory, Hargreaves & Savitch LLP

(57) ABSTRACT

A controller is configured to receive a write request from a host, and send an intermediate parity generation command corresponding to a specified address indicated by the write request to a first storage device in storage devices. The intermediate parity generation command instructs generation of an intermediate parity from new data at the specified address and old data that is updated to the new data. The intermediate parity generation command includes a first address in the memory area at which the new data is stored and a second address in the memory area for storing the intermediate parity. The first storage device is configured to receive the intermediate parity generation command, acquire the new data from the first address, generate the intermediate parity from the new data and the old data stored in the first storage device, and store the intermediate parity at the second address.

10 Claims, 13 Drawing Sheets

(52) U.S. Cl.
CPC .......... *G06F 3/0659* (2013.01); *G06F 3/0673* (2013.01); *G06F 3/0688* (2013.01); *G06F 11/108* (2013.01); *G06F 11/1096* (2013.01)

(58) Field of Classification Search
CPC ... G06F 3/0688; G06F 11/108; G06F 11/1096
See application file for complete search history.

(56) References Cited

U.S. PATENT DOCUMENTS

| | | | |
|---|---|---|---|
| 8,132,044 B1* | 3/2012 | Saeed | G06F 11/1088 714/6.1 |
| 9,384,093 B1* | 7/2016 | Aiello | G06F 3/0688 |
| 2009/0307421 A1* | 12/2009 | Galloway | G06F 11/1076 711/114 |
| 2011/0238885 A1* | 9/2011 | Kitahara | G06F 3/0613 711/103 |
| 2011/0296117 A1* | 12/2011 | Fukuda | G06F 12/1483 711/154 |
| 2013/0290773 A1* | 10/2013 | Yoshihara | G11C 29/52 714/6.21 |
| 2013/0290777 A1 | 10/2013 | Yoshihara | |
| 2014/0317340 A1* | 10/2014 | Nishina | G06F 3/0608 711/103 |
| 2015/0161003 A1 | 6/2015 | Yoshihara | |
| 2016/0004642 A1* | 1/2016 | Sugimoto | G06F 3/06 711/128 |
| 2017/0322845 A1* | 11/2017 | Nomura | G06F 3/0613 |
| 2019/0050289 A1* | 2/2019 | Kachare | H03M 13/154 |

FOREIGN PATENT DOCUMENTS

| | | |
|---|---|---|
| WO | 2015/121912 A1 | 8/2015 |
| WO | 2015/145724 A1 | 10/2015 |

* cited by examiner

| WRITE REQUEST MANAGEMENT INFORMATION 331 ||||
|---|---|---|---|
| REQUEST ID | PROCESSING MP | PHASE | LOGICAL ADDRESS |
| ... | ... | ... | ... |
| xxxx | MP_A | POST-PARITY GENERATION | aaaa |
| yyyy | MP_B | PRE-PARITY GENERATION | bbbb |

*FIG. 5*

| INTERMEDIATE PARITY GENERATION COMMAND 341 ||
|---|---|
| FIELD TYPE | CONTENT |
| OPECODE | WRITE |
| ADDRESS INFORMATION 1 | ADDRESS IN CACHE MEMORY OF NEW DATA |
| ADDRESS INFORMATION 2 | ADDRESS IN CACHE MEMORY AT STORAGE DESTINATION OF INTERMEDIATE PARITY |
| COMMAND DETAILS | GENERATE INTERMEDIATE PARITY |
| ADDRESS INFORMATION 3 | LOGICAL ADDRESS OF NEW DATA |

*FIG. 6*

| NEW PARITY GENERATION COMMAND 342 ||
|---|---|
| FIELD TYPE | CONTENT |
| OPECODE | WRITE |
| ADDRESS INFORMATION 1 | ADDRESS IN CACHE MEMORY OF INTERMEDIATE PARITY |
| COMMAND DETAILS | GENERATE NEW PARITY |
| ADDRESS INFORMATION 3 | LOGICAL ADDRESS OF NEW PARITY |

*FIG. 7*

| RESET COMMAND 351 ||
|---|---|
| FIELD TYPE | CONTENT |
| ADDRESS INFORMATION | LOGICAL ADDRESS OF DATA NODE |
| COMMAND DETAILS | RESET INTERMEDIATE PARITY GENERATION |

*FIG. 9A*

| RESET COMMAND 352 ||
|---|---|
| FIELD TYPE | CONTENT |
| ADDRESS INFORMATION | LOGICAL ADDRESS OF PARITY NODE |
| COMMAND DETAILS | RESET NEW PARITY GENERATION PROCESSING |

*FIG. 9B*

STORAGE SYSTEM FOR IMPROVED EFFICIENCY OF PARITY GENERATION AND MINIMIZED PROCESSOR LOAD

BACKGROUND

The present invention relates to a storage system.

As background art related to the present disclosure, there is known WO 2015/145724, for example. WO 2015/145724 discloses the following configuration in, for example, the Abstract thereof.

When a storage system stores write data in a plurality of non-continuous areas within the stripe of a storage device, a new data transmission command that contains information identifying the plurality of non-continuous areas is sent to the storage device with the write data. Then, an intermediate parity that is generated from a plurality of write data and pre-update data on the plurality of write data is received from the storage device, and an intermediate parity transmission command and the intermediate parity are sent to the storage device that stores the parity. Then, when a data confirmation command that contains the information identifying the plurality of non-continuous areas is sent to a plurality of the storage devices, the store device that stores the parity generates a post-update parity from the received intermediate parity and the pre-update parity that correlates with the intermediate parity and stores the post-update parity in a storage medium.

Patent Literature 1: WO 2015/145724

SUMMARY

In the above-described storage system, a storage controller and the plurality of storage devices are connected to each other by, for example, an SCSI standard and the following steps are executed during parity update. (1) A new data transmission command is issued from the controller to a storage device 1 (new data is sent from the controller to the storage device 1). (2) A completion response (completion command) is issued from the storage device 1 to the new data transmission command. (3) An intermediate parity transmission command is issued from the storage device 1 to the controller (an intermediate parity is sent from the storage device 1 to the controller). (4) A completion response (completion command) corresponding to the intermediate parity transmission command is issued from the controller. (5) The intermediate parity transmission command is issued from the controller to the storage device 2. (6) A completion response (completion command) corresponding to the intermediate parity transmission command is issued from the storage device 2. (7) A new parity generation completion response (completion command) for the controller is issued from the storage device 2.

In the above-described storage system, the commands in Steps (1) to (7) are issued each time parity update is executed as a result of data writing from a host. When a large number of commands are issued, load on the processor increases. Therefore, the number of commands issued is preferably reduced in order to minimize load on the processor during parity update and increase processing capability of the storage system.

One representative example of the present invention is a storage system including a controller with a memory area, and a plurality of storage devices each including a storage medium, the controller being configured to: receive a write request from a host; and send an intermediate parity generation command corresponding to a specified address indicated by the write request to a first storage device in the plurality of storage devices, in which the intermediate parity generation command instructs generation of an intermediate parity from new data at the specified address and old data that is updated to the new data, the intermediate parity generation command includes a first address in the memory area at which the new data is stored and a second address in the memory area for storing the intermediate parity, and the first storage device is configured to receive the intermediate parity generation command, acquire the new data from the first address, generate the intermediate parity from the new data and the old data stored in the first storage device, and store the intermediate parity at the second address.

According to the present invention, storage system performance can be improved by increasing efficiency of parity generation and minimizing processor load.

BRIEF DESCRIPTION OF THE DRAWINGS

FIG. 5 is an illustration of an exemplary configuration of the write request management information.

FIG. 6 is an illustration of an exemplary configuration of an intermediate parity generation command.

FIG. 7 is an illustration of an exemplary configuration of a new parity generation command.

FIG. 9A illustrates an exemplary configuration of a reset command.

FIG. 9B illustrates an exemplary configuration of a reset command.

DETAILED DESCRIPTION OF THE EMBODIMENTS

Embodiment 1

Figure 1:
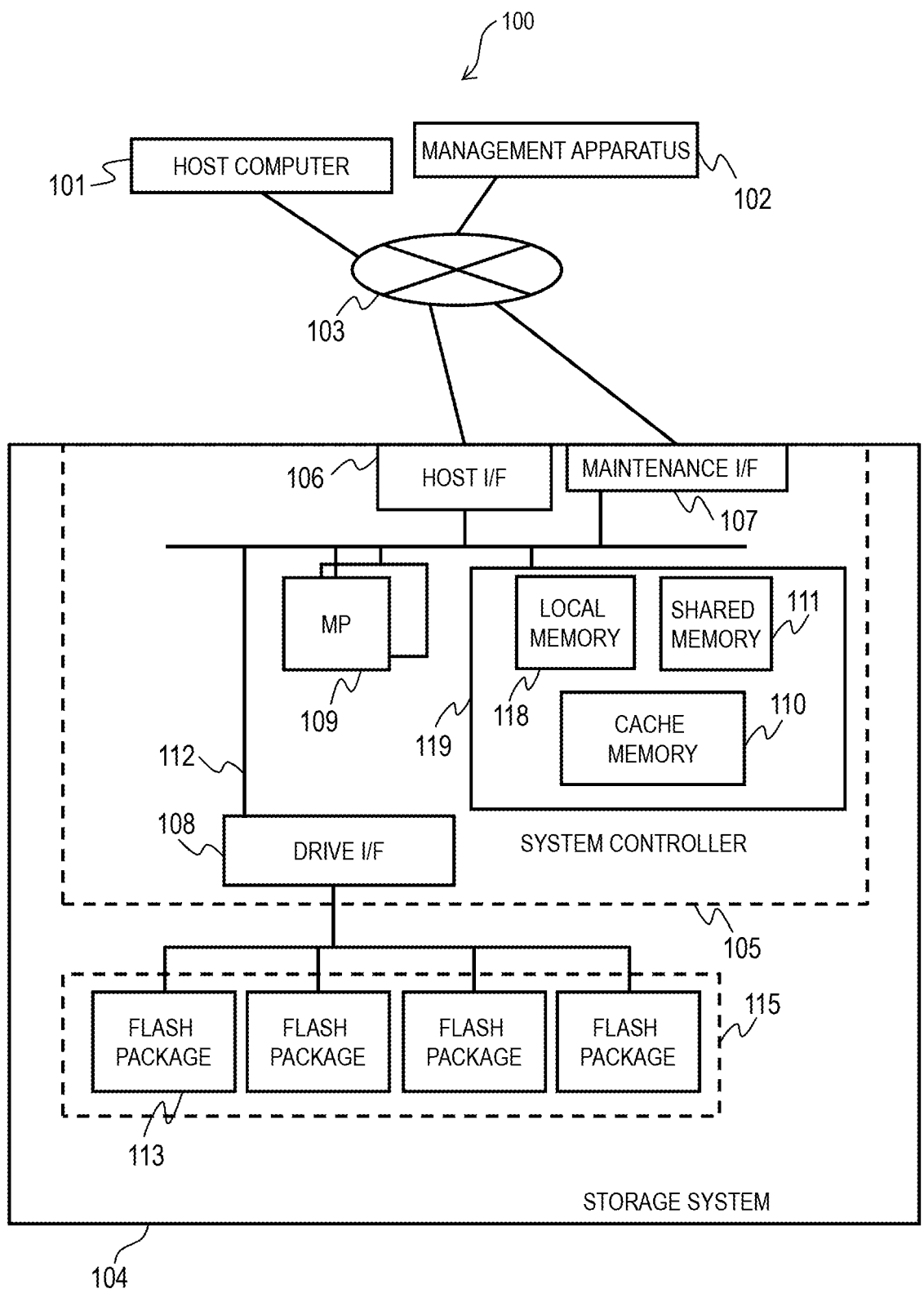
FIG. 1 is an illustration of an exemplary configuration of a computer system.

An embodiment is described below with reference to the drawings. However, the present embodiment is merely an example for embodying the invention and is not intended to limit the technical scope of the invention. In addition, common components in the figures are denoted by the same reference symbols.

Note that information according to the present invention is described below using the expression "table", but the information does not need to be expressed as having a data structure in the form of a table and may be expressed as having a data structure in the form of a "list", a "database (DB)", a "queue" or other forms. Therefore, "tables", "lists", "DBs", "queues" and the like can be simply referred to as "information" in order to indicate that data is not dependent on data structure. In addition, expressions such as "identification information", "identifier", "name" and "ID" can be used when describing the content of each type of information, and these expressions can be used interchangeably.

The subject of the following description is "program", but a program executes processing that is determined by being executed by a processor while using memory and a communication port (communication control device), and hence the subject of the following description may be "processor" or "controller". Further, processing disclosed using the subject "program" may be processing that is executed by a computer in, for example, a management apparatus or an information processing device. The program may be partially or wholly executed by dedicated hardware or may be modularized. Each type of program may be installed on each computer using a program distribution server or a storage medium.

In recent years, computers and storage systems have been required to have a large memory area in order to perform high-speed analysis and high-speed I/O processing on large amounts of data. For example, there are applications such as an in-memory database for computers. However, the DRAM capacity that can be allotted to devices is limited due to cost-related reasons and electrical installation constraints. Therefore, as a way to deal with this problem, there is a movement to use a semiconductor storage medium such as a high-speed NAND flash memory that is slower than a DRAM but faster than an HDD.

These types of semiconductor storage media are called solid state drives (SSD) and are commonly used by being connected to a computer or a storage controller with a disk I/O interface connection such as serial ATA (SATA) or serial attached SCSI (SAS) and the protocols thereof.

However, while computer performance increases, access via the disk I/O interface and the protocols thereof causes large overhead and latency. Therefore, more recent years have seen the advent of PCIe solid-state drives (PCIe-SSD or PCIe-flash) that enable access with low latency using the newly devised non-volatile memory express (NVMe) protocol that can be made compatible with a PCI-express (PCIe), which is a general-use bus that can be directly connected to a processor, for utilizing high speed of the PCIe.

In the present embodiment, an NVMe command, for example, is used. The NVMe command allows a storage device to directly access memory on a controller during parity generation. With NVMe, an I/O command that provides support for data transmission/reception is very simple with only three required support commands of write, read and flush. With conventional disk I/O protocols such as SAS, the host is the primary medium and commands and data are sent to a device side. In contrast, with NVMe, the host only notifies the device that a command has been generated and acquisition of the command and data transfer is executed with the device side as the primary medium.

In other words, command acquisition and data transfer are executed by being replaced with an action from the device side. For example, when the content of a command acquired by the device is "write", the host conventionally sends write data to the device, but with NVMe, this task is executed by the device performing an operation of reading the data in the host. On the other hand, when the content of the command is "read", read command processing is executed by the device performing an operation of writing data to memory of the host.

In other words, with NVMe, because the device side controls operation timing as well as command reception and data read/write transfer, excess resources do not need to be reserved for receiving a request from the host at any time.

Therefore, in the present embodiment, by including address information on the controller and address information on the storage device in the issued command, parity generation is made more efficient and processor load is minimized, and this improves processing capacity of the storage system.

FIG. 1 is an illustration of an exemplary configuration of a computer system 100 according to the embodiment. The computer system 100 includes a host computer 101, a management apparatus 102 and a storage system 104. The host computer 101, the management device 102 and the storage system 104 are all connected to each other via a network 103. The network 103 is, for example, a storage area network (SAN). The management apparatus 102 may be connected to another device via a management network separate to the network 103.

The host computer 101 is a computer that executes application programs and accesses a logical storage area of the storage system 104 via the network 103. The host computer 101 includes, for example, an input device, an output device, a central processing unit (CPU), memory, a disk adaptor, a network adaptor and a secondary storage device (not shown).

The host computer 101 executes an application program used by a user and a storage system control program which controls an interface with the storage system 104. The host computer 101 uses a volume provided by the storage system 104. The host computer 101 issues a read command or a write request for the provided volume, to thereby access data stored in the volume.

The management apparatus 102 manages the storage system 104 and makes up, for example, the storage area of the storage system 104. The management apparatus 102 runs a management program for managing the storage system 104. Similar to a general-purpose computer, the management apparatus 102 includes input/output devices such as a keyboard and a display, a CPU, memory, a network adapter and a secondary storage device.

The storage system 104 includes a system controller 105 and a plurality of flash packages 113. The storage system 104 stores data in storage areas of the flash packages 113. The storage system 104 provides one or more volumes to the host computer 101.

The system controller 105 includes a host interface (I/F) 106, a maintenance I/F 107, a drive I/F 108, a microprocessor (MP) 109, a memory unit 119 and the plurality of flash packages 113. These components are all connected to each other via a bus 112.

The host I/F 106 is an interface that is used so that the storage system 104 can communicate with an initiator of the host computer 101. A request (read request, write request, etc.) issued by the host computer 101 for accessing a volume reaches the host I/F 106. The storage system 104 returns information (for example, read data) from the host I/F 106 to the host computer 101.

The maintenance I/F 107 is an interface device that allows the storage system 104 to communicate with the management apparatus 102. A command from the management apparatus 102 reaches the maintenance I/F 107. The storage system 104 returns information from the maintenance I/F 107 to the management apparatus 102.

FIG. 1 illustrates a configuration in which both the host I/F 106 and the maintenance I/F 107 are connected to the network 103, but the host I/F 106 and the maintenance I/F 107 may be connected to different networks.

The system controller 105 contains one or a plurality of the MPs 109. The MP 109 executes a program for controlling various functions of the storage system 104. The memory unit 119 is formed of a cache memory 110, a shared memory 111 and a local memory 118. The cache memory 110, the shared memory 111 and the local memory 118 may be used as areas physically divided within one memory, or each memory may be a physically separate memory.

The cache memory 110 provides a cache area. The cache memory 110 is formed of, for example, a random access memory (RAM) and temporarily stores data that is read/written from/to the flash packages 113. The shared memory 111 is formed of a hard disk, a flash memory, a RAM and other components and stores programs operated by the storage controller and configuration information. The local memory 118 is used for temporarily storing programs run by the MP 109 and information used by the MP 109.

The cache memory 110 is used as a temporary storage area for temporarily storing write data for the volume (storage device) or data (read data) that is read out from the volume (storage device).

More specifically, for example, the read data stored in the cache memory 110 may be stored in the cache memory 110 without being deleted even after being returned to the host computer 101.

In addition, for example, the read data may be deleted from the cache memory 110 after the read data is returned to the host computer 101. A volatile storage medium such as a dynamic random access memory (DRAM) or a static random access memory (SRAM) is used as the cache memory 110, but a nonvolatile memory may be used as the cache memory 110.

The shared memory 111 provides a common storage area for storing management information used by the MP 109. Similar to the cache memory 110, a volatile storage medium such as a DRAM or a SRAM is used as the shared memory 111, but a nonvolatile storage medium may be used.

The flash package 113 is a storage device that includes a nonvolatile storage medium for storing write data from the host computer 101. The storage medium of the flash package 113 is a nonvolatile semiconductor memory such as a flash memory or another storage medium. One example of the flash package 113 is an SSD.

To increase reliability, the plurality of flash packages 113 forms a redundant array of independent disks (RAID) group 115. The MP 109 has a RAID function that can restore data in a flash package 113 even if that flash package 113 malfunctions.

One or more logical volumes is created in the RAID group 115. One logical volume is correlated with a physical storage area of the flash memory package 113 that forms the RAID group 115.

The RAID function distributes and stores sets of write data and redundant data received from the host computer 101 to the flash packages 113 in the RAID group 115. There is known a plurality of RAID levels. For example, a RAID 1 stores write data and a copy of the write data in different flash packages 113.

Alternatively, a RAID 5 distributes and stores redundant data sets formed of write data and one parity to different flash packages 113 and distributes and stores redundant data formed of write data and two parities to different flash packages 113.

Note that in this embodiment, there is described an example in which the host computer 101 is connected to the system controller 12 via a network, but the configuration of hardware of the storage system 104 may be the same as a server. For example, in place of the storage system 104 according to this embodiment, the plurality of flash packages 113 may be installed on (or connected to) a general-use computer (hereinafter simply referred to as "computer") such as a personal computer and various types of program may be run on the computer. In this case, the computer receives an I/O request from the server and stores data in the flash packages 113 or reads out data from the flash packages 113.

In the case of a configuration in which various programs are run on a computer, both programs run on the storage system and programs run on the server may be configured so as to be run on the same computer. In this case, for example, at least a server virtual machine that runs programs run by the server and a storage virtual machine that runs various programs on the storage system only need to be formed by running a hyper visor program that forms a virtual machine on a computer, and the read request or the write request is issued from the server virtual machine. Therefore, the host computer 101 may be replaced by a "server virtual machine" in the following description.

Figure 2:
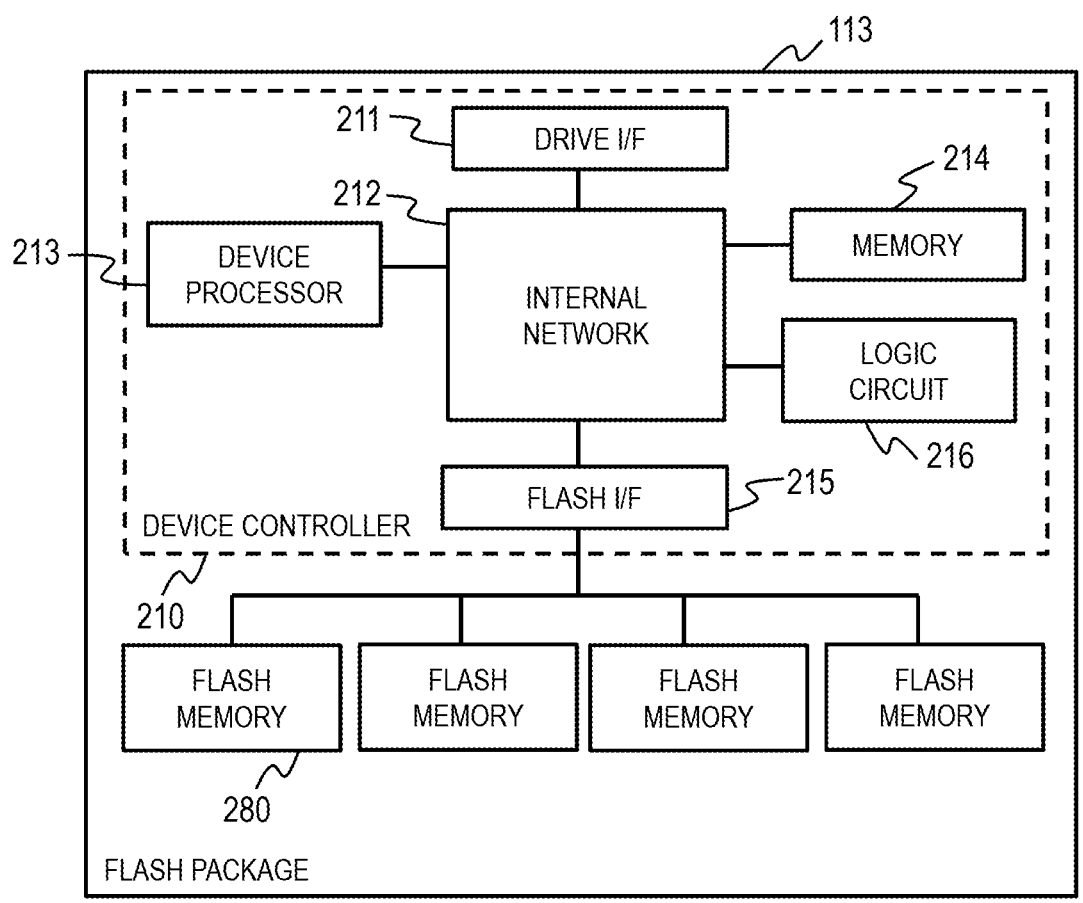
FIG. 2 is an illustration of an exemplary configuration of the flash package.

FIG. 2 is an illustration of an exemplary configuration of the flash package 113. The flash package 113 includes a device controller 210 and a flash memory 280 that is a storage medium for storing write data from the host computer 101. The device controller 210 includes a drive I/F 211, a device processor 213, a memory 214, a flash I/F 215 and a logic circuit 216. These components are connected to each other via an internal network 212. The logic circuit 216 performs, for example, parity calculation, encryption processing and compression processing.

The drive I/F 211 is an interface device for communicating with the system controller 105. The flash I/F 215 is an interface device that allows the device controller 210 to communicate with the flash memory 280.

The device processor 213 runs programs for controlling the flash packages 113. In this example, processing performed by the flash packages 113 in the description below is performed by the device processor 213 running programs.

The memory 214 stores programs run by the device processor 213 and control information and the like used by the device processor 213. The memory 214 also has a temporary storage area for temporarily storing data that is read/written from/to the flash memory 280.

The device processor 213 receives a request from the MP 109 and executes processing based on the received command. For example, the device processor 213 receives a write command from the MP 109 and writes the data in that write command to the flash memory 280. The device processor 213 returns a completion response (response command) of the write command to the MP 109 after data is written to the flash memory 280 or the temporary storage area in the memory 214.

The device processor 213 receives a read command from the MP 109, reads out data of the read command from the flash memory 280 or the temporary storage area in the memory 214 and returns the data to an MP package 109. Details of commands sent from the MP 109 to the flash package 113 and processing performed by the flash package 113 on the commands are described later.

As in a log structure file system, for example, the storage system 104 adds new data to the flash memory 280 in the flash package 113 which is a storage medium. When there is a request to update data specified by a logical address indicated by a request from the host computer 101, the storage system 104 does not overwrite update data with old data but adds the data to a storage area in the flash memory 280 different to the old data. The flash memory 280 holds past data and current data of the logical address indicated by the request from the host computer 101.

The storage system 104 also includes, for example, mapping information in the memory 214 of the flash package 113. The mapping information is information for controlling a logical address and a physical address by corresponding those addresses to each other. The logical address is an address in an address space for access by the host computer 101 and is an I/O address (volume identifier and address in the volume) to the volume. The physical address is an address at which the data inside the flash memory 280 is actually stored.

When the host computer 101 sends a request for updating data, the storage system 104 updates the mapping information by changing correlation from a physical address at which old data corresponding to the logical address indicated by the update request is stored to a physical address at which update data is stored. The mapping information may hold both physical addresses of update data and old data even with a configuration in which the mapping information holds only the physical address of update data.

If the mapping information holds only the physical address of the update data, the mapping information may be updated by the storage system 104 canceling the correlation between the physical address and the logical address of the old data, that is, deleting the physical address of the old data and associating the physical address of the update data with the logical address when the update data is stored in the flash memory 280.

If the mapping information holds the physical addresses of both the update data and the old data, the storage system 104 may correlate the logical address with both the physical address of the update data and the physical address of the old data for a predetermined period of time after the update data is stored in the flash memory 280. In addition, after the predetermined period of time has elapsed, the storage system 104 may cancel the correlation between the logical address and the physical address of the old data, that is, delete the physical address of the old data. The timing at which the correlation is canceled may be after a predetermined command or a predetermined completion response has been received, regardless of how much time has passed.

Adding data improves write speed, in particular, write speed in the flash packages 113 that use the NAND flash. The flash packages 113 or the MP 109 manage addresses for adding.

Figure 3:
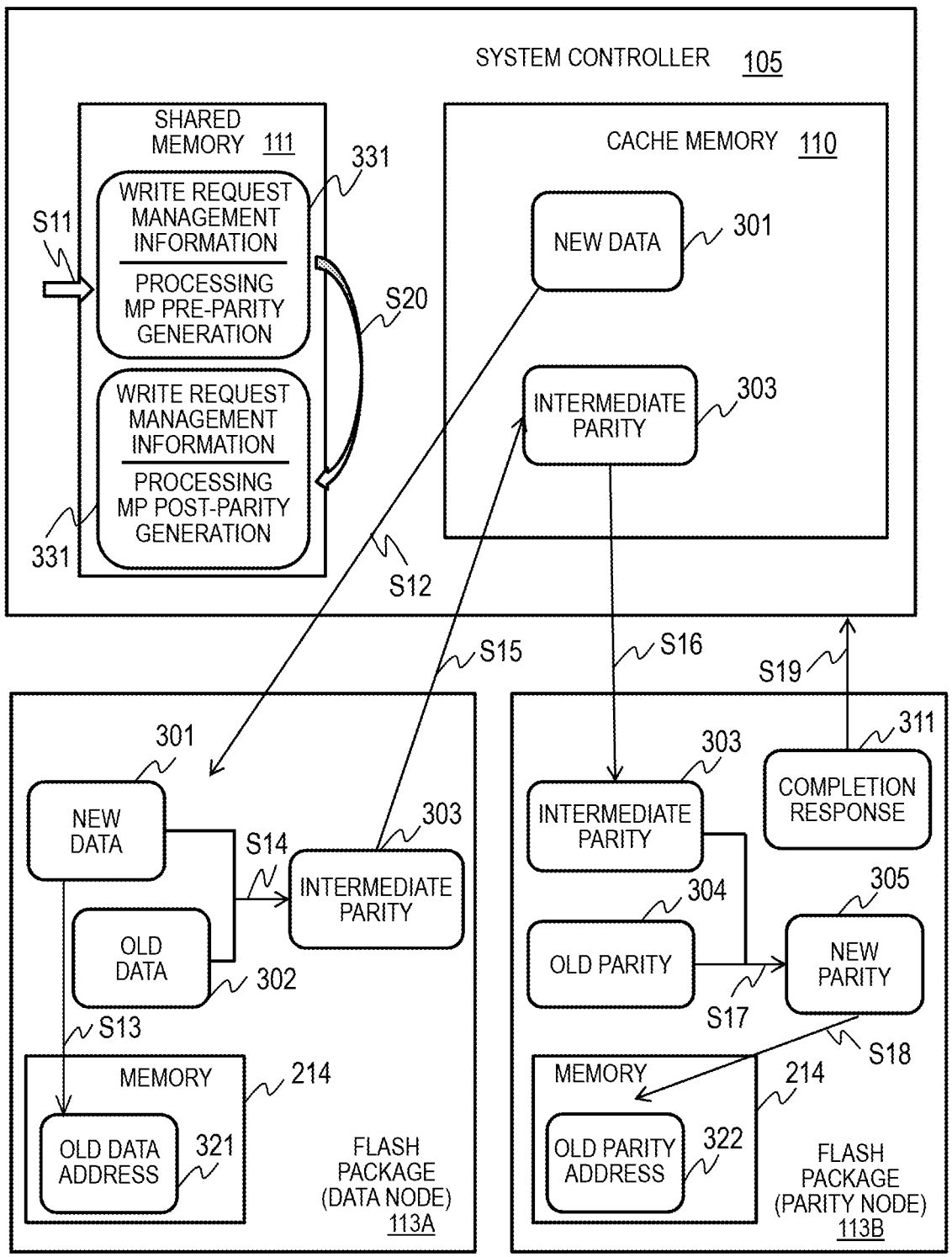
FIG. 3 is an illustration of an exemplary normal sequence of data update in response to a write request from the host computer.
Figure 4:
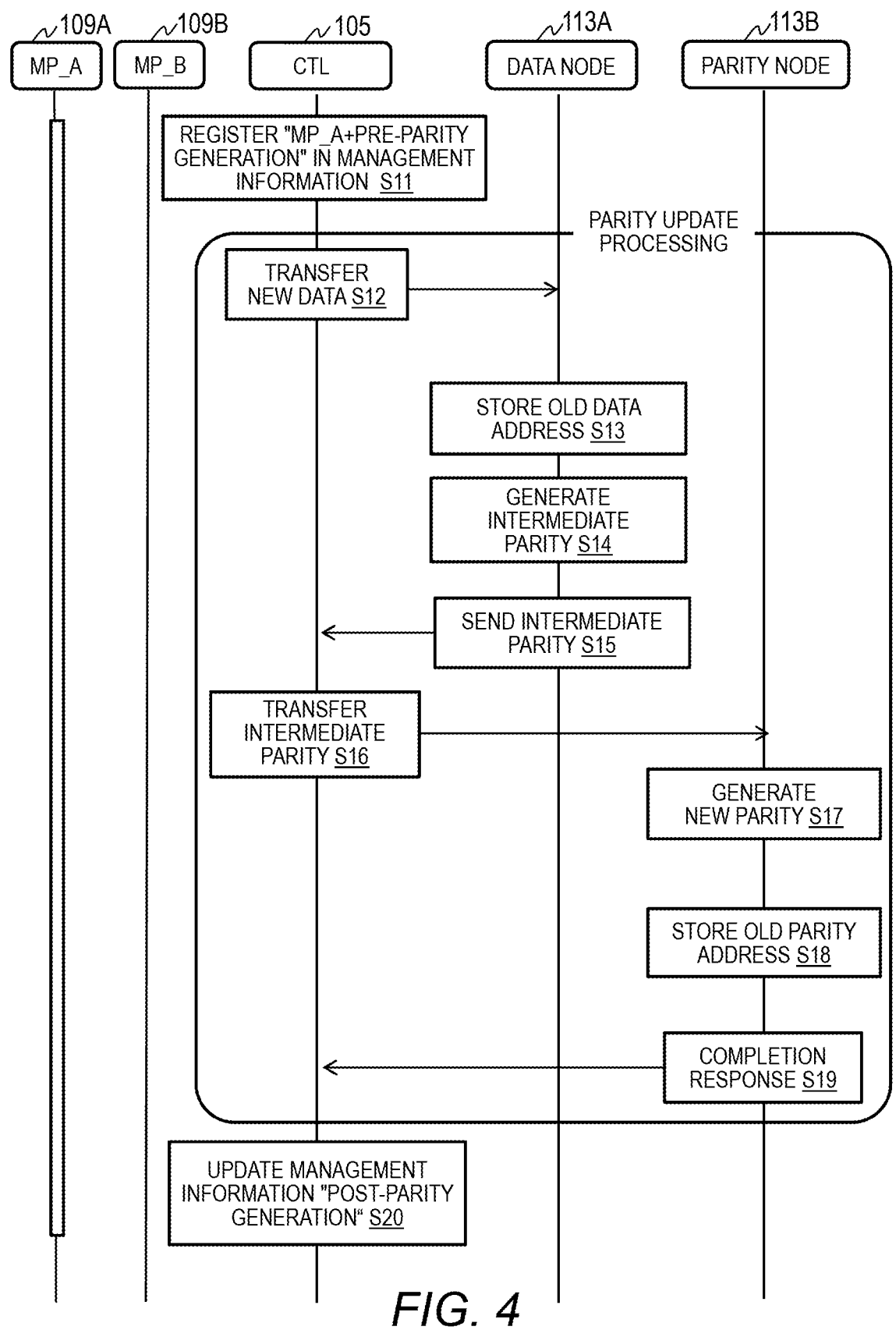
FIG. 4 is an illustration of the exemplary normal sequence of data update in response to a write request from the host computer.

FIGS. 3 and 4 are illustrations of an exemplary normal sequence of data update in response to a write request from the host computer 101. The system controller (CTL in the figures) 105 receives a write request and a new data 301 from the host computer 101. In this embodiment, the MP 109 that processes the write request according to the address of the write request is preset. In this example, an MP_A 109A is the preset processing MP.

The MP_A 109A registers information on the received write request in a write request management information 331 (S11). FIG. 5 is an illustration of an exemplary configuration of the write request management information 331. The write request management information 331 is stored in the shared memory 111 and indicates the write request, the MP that processes the write request and the processing phase of the write request. More specifically, the write request management information 331 has a column for each of a request ID, the processing MP, the phase and a logical address.

The request ID column indicates an identifier of the write request. A unique value is assigned to every new write request. The processing MP column indicates the identifier of the MP that processes the write request. The phase column indicates the processing phase of the write request. More specifically, the phase column indicates either one of "pre-parity generation" or "post-parity generation". When a new write request is received, the write request is registered with "pre-parity generation". The logical address column indicates a logical address that is a write destination of the write request.

Data (new data) pertaining to the write request from the host computer 101 is stored in the cache memory 110. The MP_A 109A generates an intermediate parity generation command from the write request received from the host computer 101. The MP_A 109A sends the intermediate parity generation command to a flash package (data node) 113A that stores an old data 302.

The intermediate parity generation command stores the new data 301 and further instructs an intermediate parity 303 to be generated from the new data 301 and the old data 302. FIG. 6 is an illustration of an exemplary configuration of an intermediate parity generation command 341. The intermediate parity generation command 341 includes an OPECODE field, an address information 1 field, an address information 2 field, a command details field and an address information 3 field.

The OPECODE field indicates the type of operation and, in this example, indicates processing of the write request from the host computer 101. The address information 1 field indicates an address at which the new data 301 is stored in the cache memory 110. The address information 2 field indicates an address for storing the newly generated intermediate parity 303 in the cache memory 110.

The command details field indicates that the current command is an intermediate parity generation command. The address information 3 field indicates the logical address of the new data 301. The logical address is also the logical address of the old data 302.

The MP_A 109A refers to the mapping information to identify the physical address at the data note 113A that stores the old data 302 of the write request from the logical address indicated by the write request. An address for storing a newly generated intermediate parity in the cache memory 110 indicates a free area in the cache memory 110.

The data node 113A refers to the received intermediate parity generation command 341 to read the new data 301 stored at the address specified by the address information 1 from the cache memory 110 and stores the new data 301 in a temporary storage area of the memory 214 (S12). The data node 113A stores the new data 301 in a free area of the flash memory 280 and updates the mapping information stored in the memory 214, that is, correlates the logical address with the physical address at which the new data 301 is stored.

Note that the processing of storing the new data 301 in the flash memory 280 and updating the mapping information do not need to be performed at S12. For example, these actions may be performed periodically at a predetermined timing without synchronizing with the reception of the intermediate parity generation command 341 or may be performed at a time at which the device processor 213 has ample processing capacity.

In addition, in this embodiment, the processing of storing the new data 301 in the flash memory 280 and the processing of generating the intermediate parity are started irrespective of the timing at which the intermediate parity generation command is received, that is, are started at times different to the reception of the intermediate parity generation command. After the device processor 213 has received the intermediate parity generation command and written data into the temporary storage area of the memory 214, the device processor 213 returns a write command completion response (response command) to the MP 109.

Note that the processing of storing the new data 301 in the flash memory 280 and the processing of generating the intermediate parity may be started upon reception of the intermediate parity generation command, that is, in synchronization with the reception of the intermediate parity generation command. In this case, the device processor 213 returns a write command completion response (response command) to the MP 109 after the new parity has been generated.

The data node 113A stores an old data address 321 in the memory 214 in response to the mapping information being updated (S13). The old data address 321 is a physical address of the old data 302 corresponding to the logical address of the new data indicated by the write request. The old data address 321 may be stored such that correlation with the logical address indicated by the write request is understood. For example, the old data address 321 may be included in the mapping information or may be stored in a format different to that of the mapping information. Note that the old data address 321 stored in the memory 214 may be deleted at a time different to the processing related to the write request or may be deleted after a predetermined period of time has passed since being stored. The old data address 321 is referenced when an error occurs. Details of this are provided later.

As described above, the flash package 113 according to this embodiment adds new data to different physical addresses without overwriting the old data with the new data.

The data node 113A refers to the mapping information to identify the physical address in the flash memory 280 of the data node 113A that stores the old data 302 from the logical address specified by the address information 3. The data node 113A reads out the old data 302 and stores the old data 302 in the memory 214. The data node 113A generates the intermediate parity 303 from the new data 301 and the old data 302 stored in the memory 214 (S14).

The data node 113A refers to the intermediate parity generation command 341 and stores the intermediate parity 303 at the address of the cache memory 110 specified by the address information 2 (S15).

As described above, as in this embodiment, both the address at which the new data 301 is stored in the cache memory 110 and the address for storing the newly generated intermediate parity 303 in the cache memory 110 are included in the intermediate parity generation command 341. Therefore, issuing one intermediate parity generation command causes new data 301 to be read from the system controller 105 to the flash package 113 and the intermediate parity 303 to be generated and written from the flash package 113 to the system controller 105. With this configuration, the intermediate parity 303 can be efficiently generated using minimal commands and steps.

Next, the MP_A 109A generates a new parity generation command from the write request received from the host computer 101. The MP_A 109A sends the new parity generation command to a flash package (parity node) 113B that stores an old parity 304. In this example, only one parity node is illustrated. However, when there is a plurality of parity nodes, the processing MP 109 sends the new parity generation command to each parity node that stores an old parity.

The intermediate parity generation command instructs a new parity 305 to be generated from the intermediate parity 303 and the old parity 304. FIG. 7 is an illustration of an exemplary configuration of a new parity generation command 342. The new parity generation command 342 includes the OPECODE field, the address information 1 field, the command details field and the address information 3 field.

The OPECODE field indicates the type of operation and, in this example, indicates processing of the write request from the host computer 101. The address information 1 field indicates an address at which the intermediate parity 303 is stored in the cache memory 110. The command details field indicates that the current command is a new parity generation command.

The address information 3 field indicates a logical address of a new parity related to data subject to the write request. The logical address is also a logical address of the old parity 304.

The MP_A 109A refers to the mapping information to identify the physical address in the parity node 113B that stores the old parity 304 of the write request from the logical address indicated by the write request.

The parity node 113B refers to the received new parity generation command 342 and reads the intermediate parity 303 stored at the address specified by the address information 1 from the cache memory 110 and stores the intermediate parity 303 in the memory 214 (S16).

The parity node 113B refers to the mapping information to identify the physical address in the flash memory 280 of the parity node 113B that stores the old parity 304 from the logical address specified by the address information 3. The parity node 113B reads out the old parity 304 and stores the old parity 304 in the memory 214.

The parity node 113B generates the new parity 305 from the intermediate parity 303 and the old parity 304 stored in the memory 214 (S17). The parity node 113B stores the new parity 305 in a free area of the flash memory 280 and updates the mapping information stored in the memory 214.

The parity node 113B stores an old parity address 322 that correlates with the logical address in the memory 214 in response to update of the mapping information (S18). The old parity address 322 is referenced when an error occurs. Details of this are provided later.

Lastly, the parity node 113B returns a completion response 311 to the system controller 105 (S19).

When the MP_A 109A receives the completion response 311, the MP_A 109A updates the write request management information 331 (S20). More specifically, the MP_A 109A changes the phase in the phase column from "pre-parity generation" to "post-parity generation" for the entry of the processed write request.

As described above, the new parity generation command 342 causes the intermediate parity 303 to be read from the system controller 105 to the flash package 113 and the new parity 305 to be generated. With this configuration, the new parity 305 can be efficiently generated using minimal commands and steps.

In the above-described example, the flash packages 113 manage the addresses of added data. In other examples, the flash packages 113 may manage the addresses of data added by the system control 105 (MP 109). The system controller 105 manages the old data address and the old parity address.

The intermediate parity generation command issued by the system controller 105 includes the address at which the new data is stored in the cache memory 110 and the address at which the intermediate parity is stored. The intermediate parity generation command also includes a storage address for the new data and a storage address for the old data in the flash package 113. The flash package 113 reads out the old data from the address specified by the flash memory 280 and further stores the new data at the specified address.

The new parity generation command issued by the system controller 105 includes an address at which the intermediate parity is stored in the cache memory 110 and a storage address for the new parity and a storage address for the old parity in the flash package 113. The flash package 113 reads out the old parity from the address specified by the flash memory 280 and further stores the new parity at the specified address.

Figure 8:
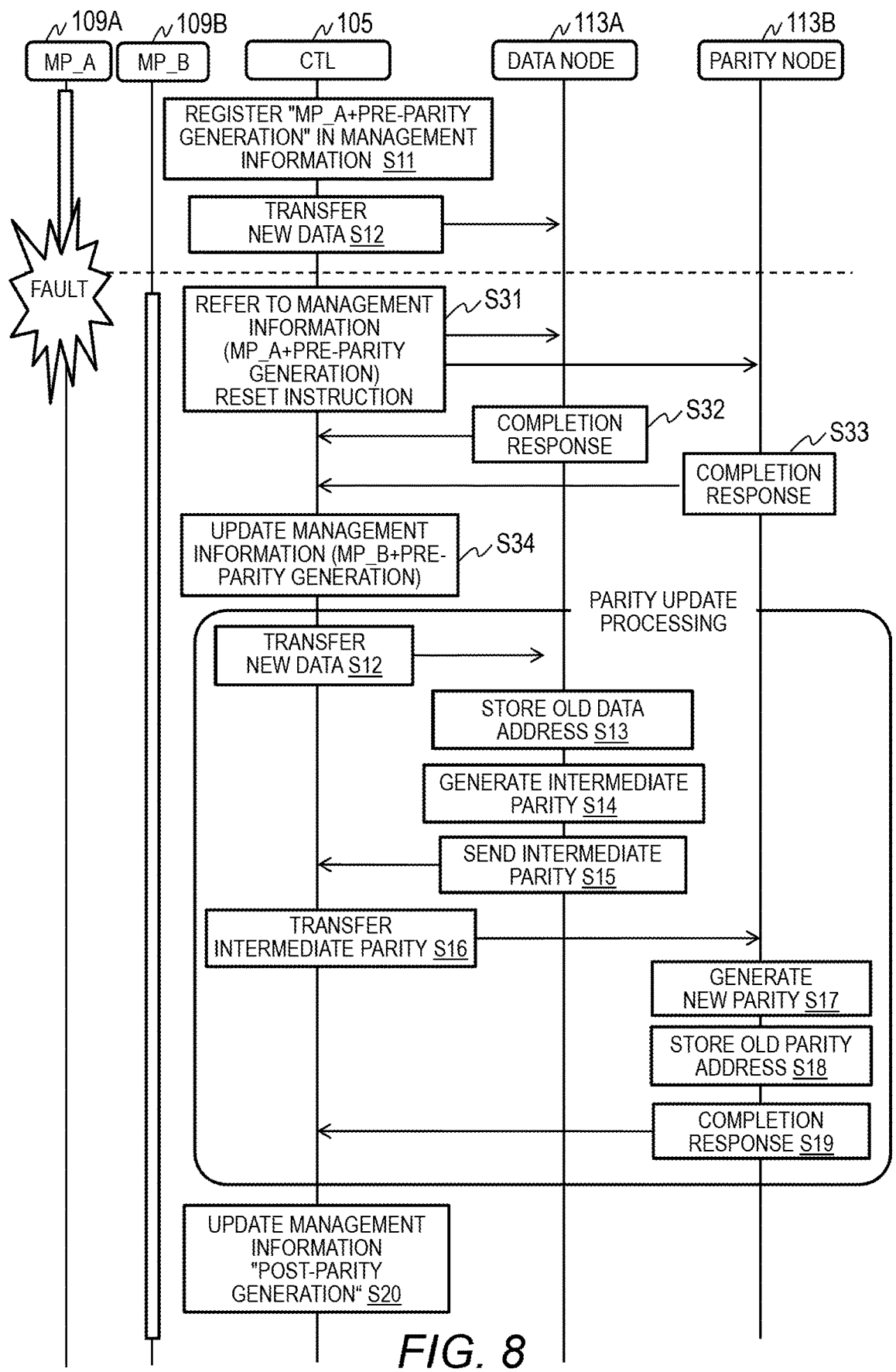
FIG. 8 is an illustration of an exemplary sequence in a case where an error has occurred during data update in response to the write request from the host computer.

FIG. 8 is an illustration of an exemplary sequence in a case where an error has occurred during data update in response to the write request from the host computer 101. In this example, an error occurs in the MP_A 109A. The following description focuses on differences to the exemplary sequence illustrated in FIG. 4.

In FIG. 8, directly after the new data 301 is transferred from the cache memory 110 of the system controller 105 to the data node 113A (S12), an error occurs in the preset processing MP_A 109A. The processing MP is handed over to an MP_B 109B from the MP_A 109A.

The MP_B 109B repeats this processing from transfer of the new data 301 (S12) after the sequence illustrated in FIG. 4 is interrupted. More specifically, the MP_B 109B refers to the write request management information 331 to acquire information on the processing handed over from the MP_A 109A (S31). Even more specifically, the processing MP acquires an entry indicating the MP_A 109A. In this example, the write request management information 331 indicates that the phase of the processing handed over from the MP_A 109A is "pre-parity generation".

The MP_B 109B notifies the data node 113A and the parity node 113B that the current processing has been interrupted. More specifically, the MP_B 109B sends a reset command to each of the data node 113A and the parity node 113B (S31).

FIGS. 9A and 9B are illustrations of an exemplary configuration of the reset command. FIG. 9A illustrates an exemplary configuration 351 of a reset command that is sent to the data node. FIG. 9B illustrates an exemplary configuration 352 of a reset command that is sent to the parity node. The reset commands represent the address information field and the command details field.

In the reset command 351 sent to the data node, similar to the address information 3 in the intermediate parity generation command 341, the address information field represents the logical address at which the new data is stored in the data node. The command details represent that generation of the intermediate parity is reset.

In the reset command 352 sent to the parity node, similar to the address information 3 in the new parity generation command 342, the address information field represents the logical address at which the new parity is stored. The command details represent that generation of the new parity is reset.

After the data node 113A and the parity node 113B have received the reset commands, the data node 113A and the parity node 113B interrupt the intermediate parity generation processing and the new parity generation processing. In the example illustrated in FIG. 8, the data node 113A has not started the intermediate parity generation processing and the parity node 113B has not started the new parity generation processing. The data node 113A and the parity node 113B each return a completion response for the reset command to the MP_B 109B (S32 and S33).

When the MP_B 109B receives the completion responses from the data node 113A and the parity node 113B, the MP_B 109B updates the write request management information 331 (S34). More specifically, the MP_B 109B changes the processing MP from MP_A to MP_B in the corresponding entry of the write request management information 331. The steps after this sequence are the same as those in FIG. 4, excluding the step in which the processing MP changes from the MP_A 109A to the MP_B109B.

Figure 10:
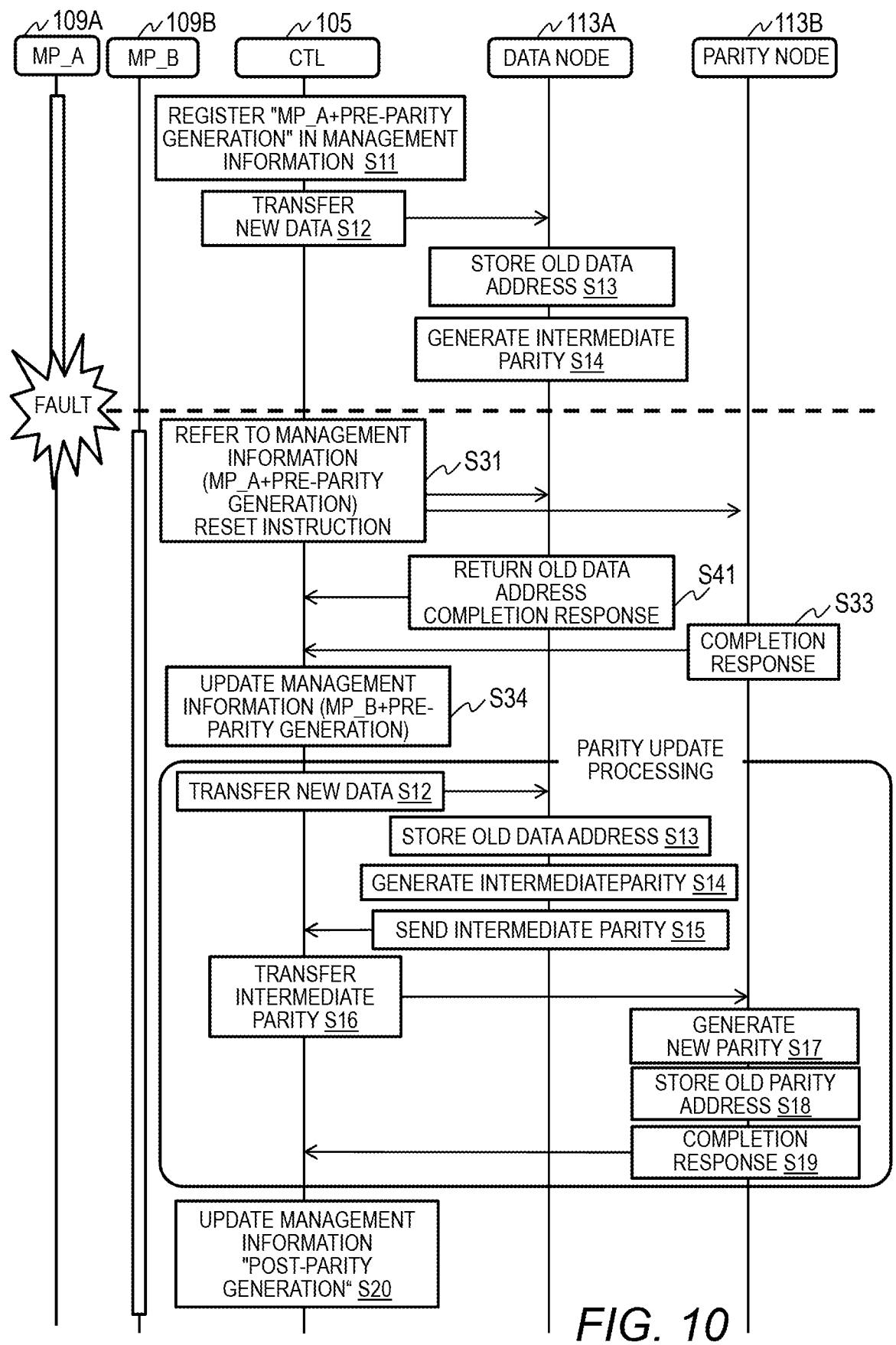
FIG. 10 is an illustration of another exemplary sequence in a case where an error has occurred during data update in response to the write request from the host computer.

FIG. 10 is an illustration of another exemplary sequence in a case where an error has occurred during data update in response to the write request from the host computer 101. In this example, an error occurs in the MP_A 109A. The following description focuses on differences to the exemplary sequence illustrated in FIG. 8.

In FIG. 10, after the data node 113A generates the intermediate parity (S14), an error occurs in the preset processing MP_A 109A before the data node 113A transfers the intermediate parity to the system controller 105. The processing MP is handed over to the MP_B 109B from the MP_A 109A.

The data node 113A and the parity node 113B receive reset commands from the MP_B109B (S31). The data node 113A returns the physical address corresponding to the logical address of the reset command 351 to the old data address 321 stored in the memory 214 for the mapping information at S13 and then returns a completion response (S41). With this configuration, the correct intermediate parity can be generated in subsequent steps.

Figure 11:
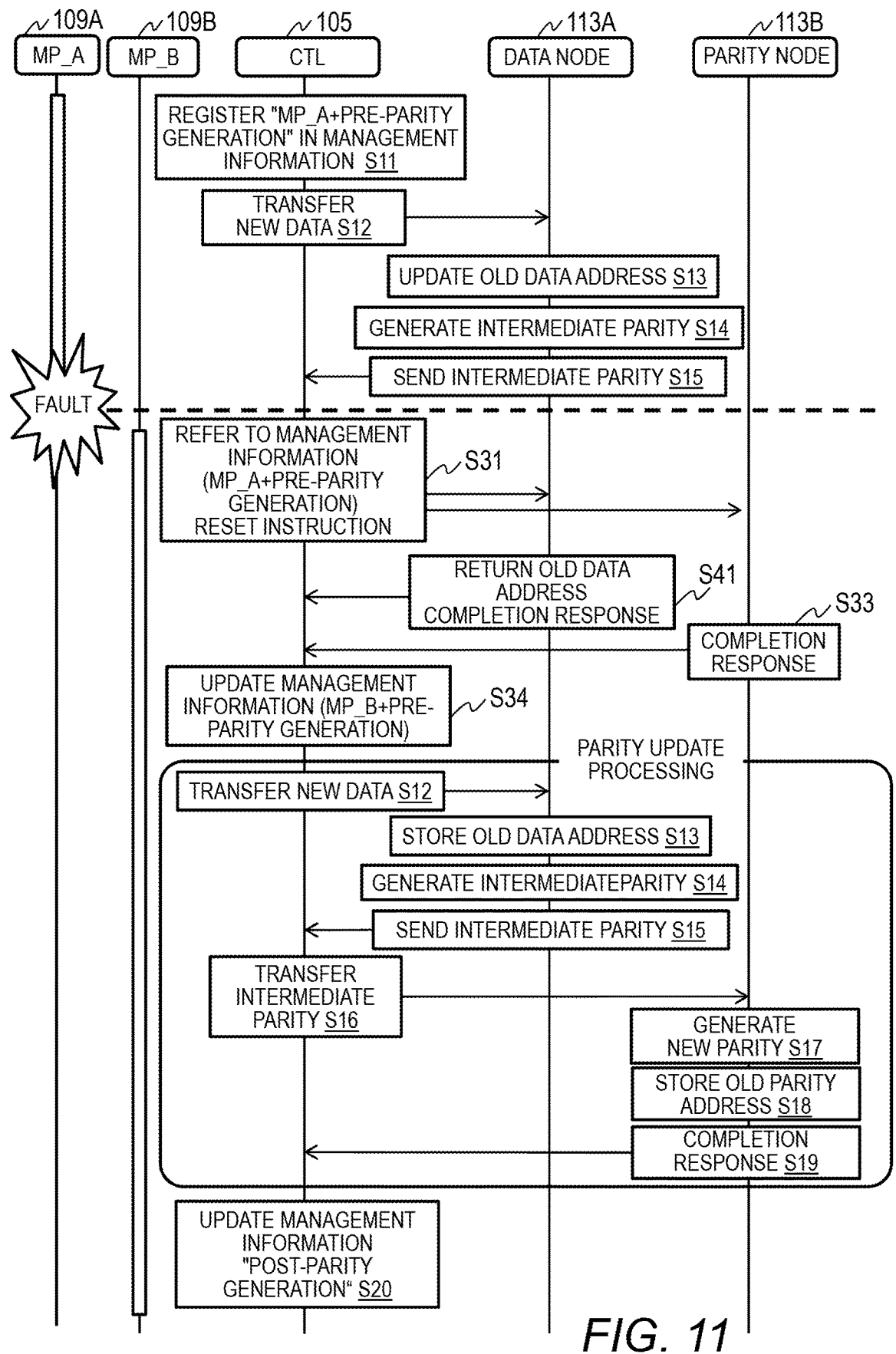
FIG. 11 is an illustration of an exemplary sequence of data update in response to a write request from the host computer.

FIG. 11 is an illustration of an exemplary sequence of data update in response to a write request from the host computer 101. After the data node 113A has sent an intermediate parity to the system controller 105 (S15), an error occurs in the preset processing MP_A 109A before the system controller 105 transfers the intermediate parity to the parity node 113B. The processing MP is handed over to the MP_B 109B from the MP_A 109A. Other aspects are the same as the sequence illustrated in FIG. 10.

Figure 12:
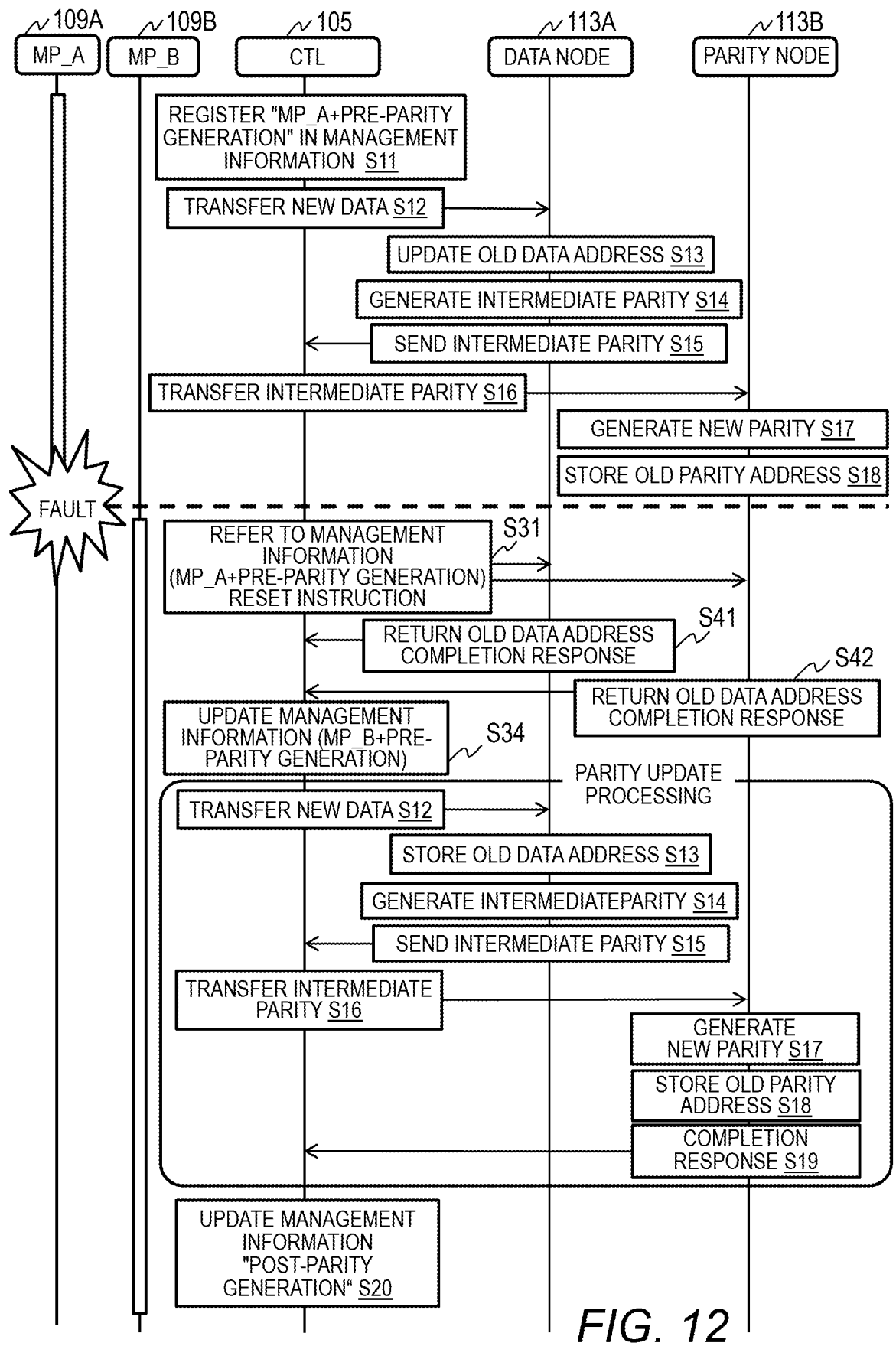
FIG. 12 is an illustration of another exemplary sequence in a case where an error has occurred during data update in response to the write request from the host computer.

FIG. 12 is an illustration of another exemplary sequence in a case where an error has occurred during data update in response to a write request from the host computer 101. After the parity node 113B has generated the new parity (S17) and stored the physical address of the old parity in the memory 214 (S18), an error occurs in the preset processing MP_A 109A before the parity node 113B sends a completion response to the system controller 105 (S19). The processing MP is handed over from the MPA_109A to the MP_B109B.

The data node 113A and the parity node 113B receive reset commands from the MP_B109B (S31).

The data node 113A returns the physical address corresponding to the logical address of the mapping information to the old data address 321 stored in the memory 214 in S13 and then returns a completion response (S41). Similarly, the parity node 113B returns the physical address corresponding to the logical address of the reset command 352 in the mapping information to the old parity address 322 stored in the memory 214 in S18 and then returns a completion response (S42). With this configuration, the correct intermediate parity and the correct new parity can be generated in subsequent steps. Other aspects are the same as the sequence illustrated in FIG. 11.

Unlike any of the above cases, if the write request management information 331 referenced by the MP_B 109B which has taken over processing indicates "post-parity generation", the MP_B 109B determines that parity update for the write request has ended. In this way, using the write request management information 331 makes it possible to appropriately prevent processing when an error has occurred.

In addition, as described above, the system controller 105 can be efficiently configured because the MP that has taken over processing starts processing from transfer of the new data even when there is an MP error in any of the steps during processing of the write request.

Because the write request management information 331 in the above-described example only manages "pre-parity generation" and "post-parity generation", the system can have a simple configuration. The write request management information 331 may indicate another phase. For example, the write request management information 331 may indicate "pre-intermediate parity generation" or "post-intermediate parity generation". The MP_B 109B that has taken over the processing performs processing according to the phase.

Embodiment 2

An embodiment different to Embodiment 1 is described with reference to FIGS. 13 to 15. In this embodiment, processing in a case where the old data address 321 and the old parity address 322 are not stored in the memory 214 is described.

Figure 13:
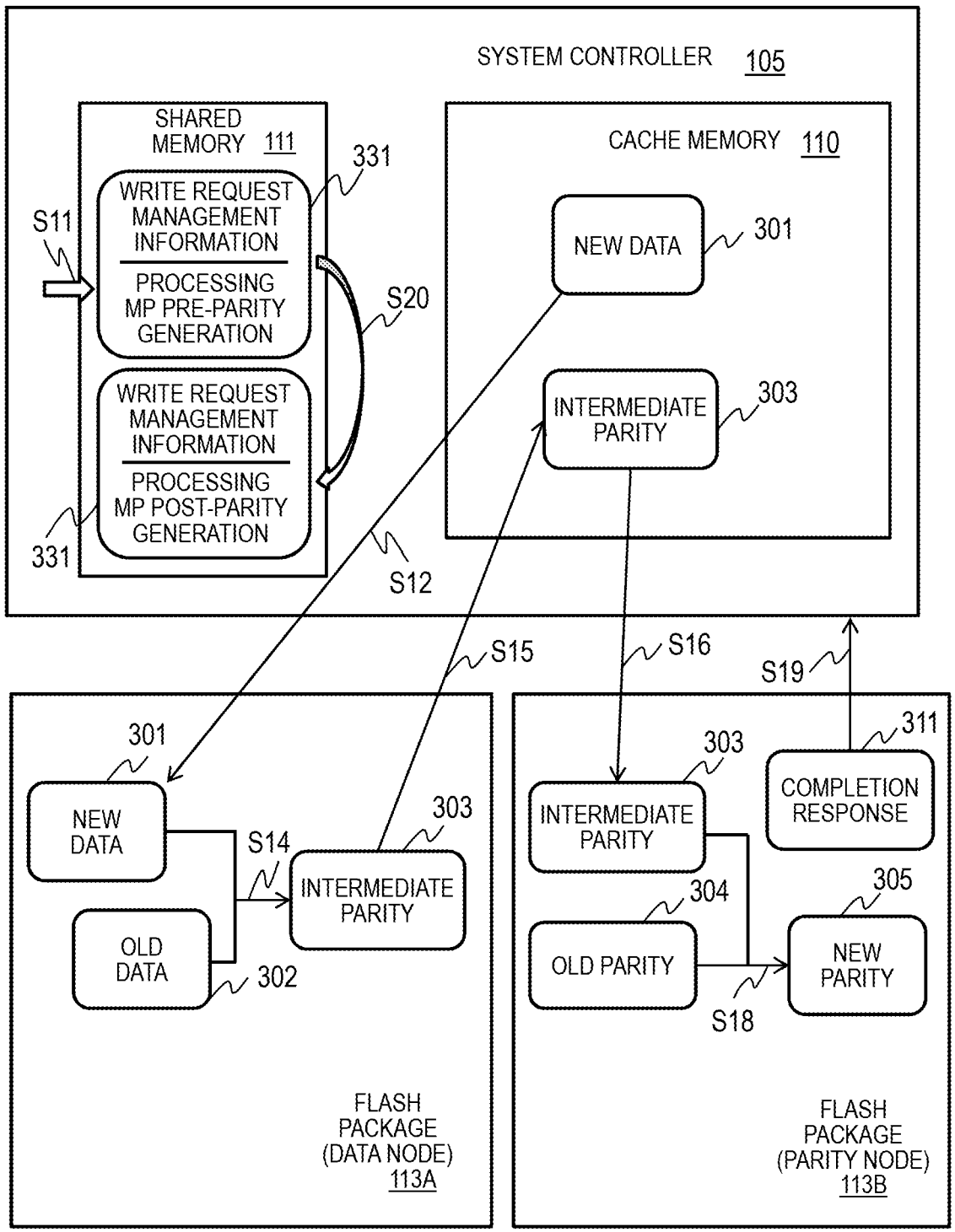
FIG. 13 is an illustration of an exemplary normal sequence of data update in response to a write request from the host computer.
Figure 14:
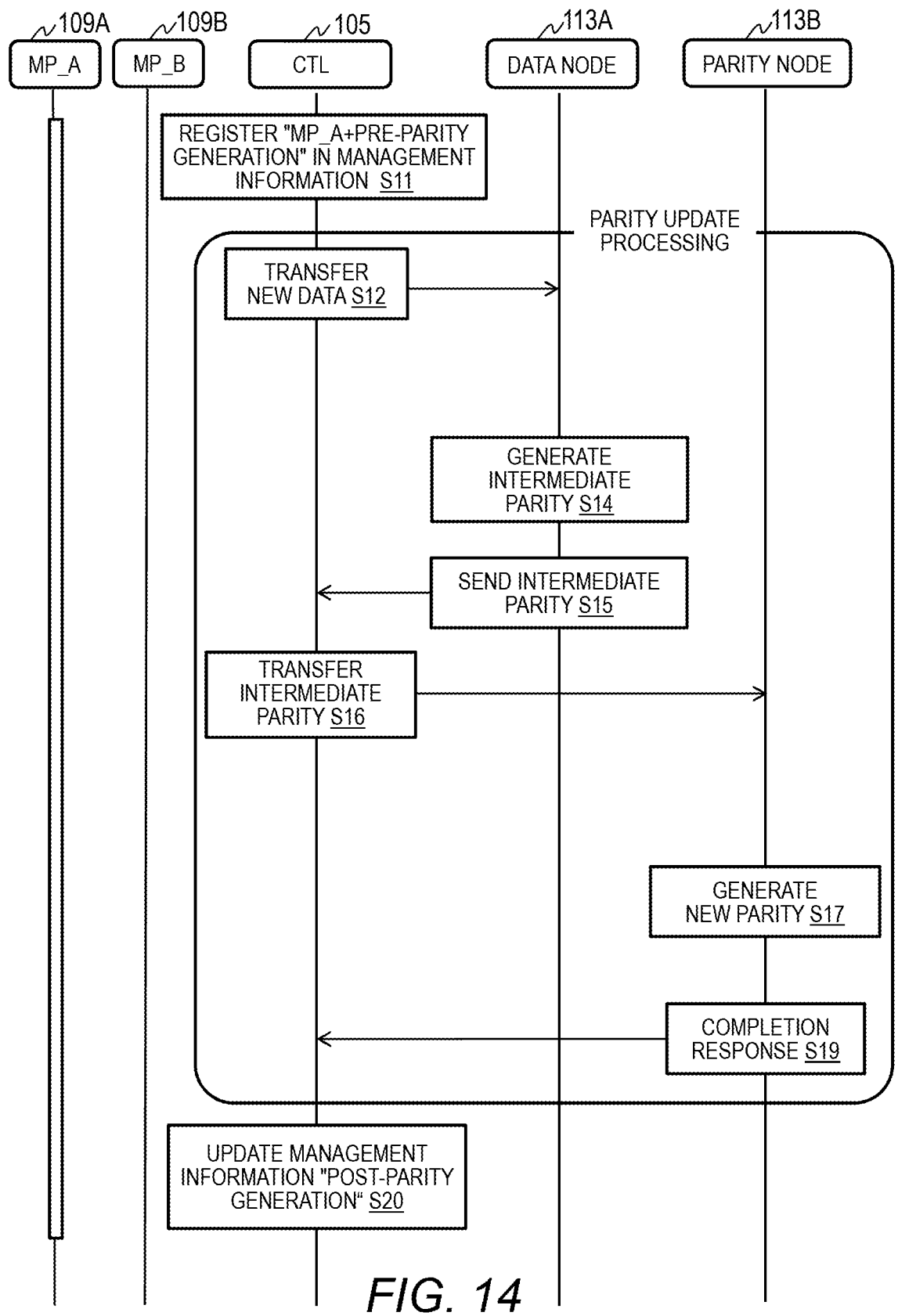
FIG. 14 is an illustration of the exemplary normal sequence of data update in response to a write request from the host computer.

FIGS. 13 and 14 illustrate another exemplary normal sequence of data update in response to a write request from the host computer 101 in this embodiment. The following description focuses on differences to the exemplary sequences illustrated in FIGS. 3 and 4. The old data address 321 and the old parity address 322 and the steps of storing these addresses (S13, S18) in the exemplary sequence illustrated in FIGS. 3 and 4 are omitted from the sequence illustrated in FIGS. 13 and 14. Other aspects are the same as the sequence illustrated in FIGS. 3 and 4 and the sequence illustrated in FIGS. 13 and 14.

Next, an exemplary sequence in a case where an error has occurred in the normal sequence illustrated in FIGS. 13 and 14 is described. In the exemplary sequence illustrated in FIG. 15, after the data node 113A sends the intermediate parity to the system controller 105 (S15), an error occurs in the MP_A 109A before the system controller 105 transfers the intermediate parity to the parity node 113B (S16).

Figure 15:
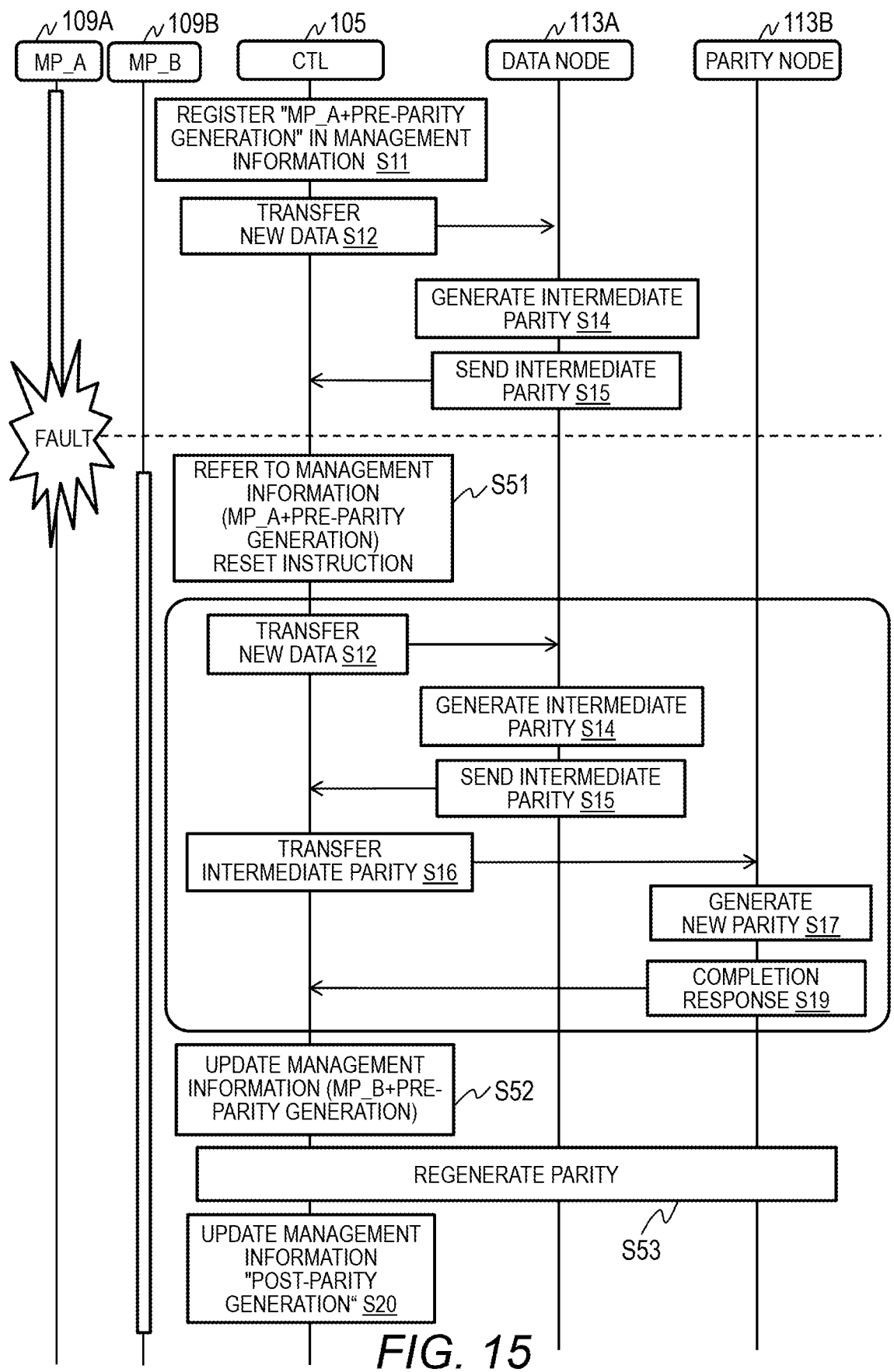
FIG. 15 is an illustration of an exemplary sequence in a case where an error has occurred during the normal sequence illustrated in FIGS. 13 and 14.

The following description focuses on differences to the exemplary sequence illustrated in FIGS. 11 and 15 in Embodiment 1. An error occurs in the preset processing MP_A 109A and the processing MP is handed over to the MP_B 109B from the MP_A 109A.

The MP_B 109B refers to the write request management information 331 to acquire information on the processing handed over from the MP_A 109A (S51). In this embodiment, the write request management information 331 indicates that the phase of the processing handed over from the MP_A 109A is "pre-parity generation".

The example of FIG. 15 differs from this sequence in FIG. 11 in that there are no steps for storage or writeback because the old data address 321 and the old parity address 322 are not used. There is also no instruction to reset the write request management information 331 and processing proceeds to the parity update processing (S12 to S19) without the write request management information 331 being updated, that is, without the steps S31 to 34 in FIG. 11. The parity update processing (S12 to S19) is executed because the phase of the write request management information 331 is "pre-parity generation".

When the MP_B 109B receives a completion response regarding new parity generation from the parity node 113B (S19), the MP_B 109B refers to the write request management information 331 with the aim of updating the write request management information 331. However, when it is determined that the processing MP stored in the write request management information 331 is different to the MP_B 109B, it is determined that parity mismatch has occurred. As a result, the processing MP of the write request management information 331 is updated to the MP_B 109B (S52) and the parity is regenerated (S53).

Note that, in this embodiment, because the old data address 321 and the old parity address 322 are not stored in the memory 214, the parity regeneration in S53 is not a method of generating the new parity using the new data, the old data and the old parity as described above but a so-called sequential write method of generating a parity. More specifically, in this sequence, the MP_B 109B stores the new data and receives data blocks in stripe columns that have generated the new parity from a plurality of data nodes including the data node 113A. The MP_B 109B generates the parity from the received data blocks in stripe columns.

In this example, because a previous data address and a previous parity address are not referenced and the processing MP is not changed, the parity node 113B may generate an incorrect new parity. Therefore, in the MP_B 109B that has taken over processing, the correct parity can be reliably held by regenerating the parity from the new data.

In the above-described configuration, some parts may be omitted. For example, the storage system 104 may generate the new parity without using the new parity generation command. For example, the system controller 105 may read out the old parity from the parity node, generate the new parity and store the new parity in the parity node. Alternatively, the intermediate parity transmission command may be sent from the system controller 105 to the parity node and the corresponding completion response and new parity generation completion response may be received.

The present invention is not limited to the above-described embodiments but includes various modifications. The above-described embodiments are explained in details for better understanding of the present invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A storage system, comprising:
a controller with a memory area; and
a plurality of storage devices each including a storage medium, the controller being configured to:
receive a write request from a host; and
send an intermediate parity generation command corresponding to a specified address indicated by the write request to a first storage device in the plurality of storage devices,
wherein the intermediate parity generation command instructs generation of an intermediate parity from new data at the specified address and old data that is updated to the new data,
wherein the intermediate parity generation command includes a first address in the memory area at which the new data is stored and a second address in the memory area for storing the intermediate parity,
wherein the first storage device is configured to receive the intermediate parity generation command, acquire the new data from the first address, generate the intermediate parity from the new data and the old data stored in the first storage device, and store the intermediate parity at the second address, and
wherein the controller includes a plurality of processors;
a first processor in the plurality of processors is configured to start processing the write request and store write request management information indicating a processing phase of the write request in a shared storage area using the plurality of processors; and
a second processor in the plurality of processors is configured to take over processing of the write request in response to an error in the first processor and refer to the write request management information in the shared storage area to identify a phase of processing of the write request.

2. The storage system according to claim 1, wherein:
the controller sends a new parity generation command to a second storage device in the plurality of storage devices;
the new parity generation command instructs generation of a new parity from the intermediate parity and an old parity related to old data at the specified address;
the new parity generation command includes the second address; and
the second storage device is configured to receive the new parity generation command, read out the intermediate parity from the second address, and generate the new parity from the intermediate parity and the old parity stored in the second storage device.

3. The storage system according to claim 1, wherein, in a case where the write request management information indicates pre-generation of the new parity, the second processor sends, to each of the first storage device and the second storage device, a reset command instructing the first storage device and the second storage device to stop processing the intermediate parity generation command and the new parity generation command.

4. The storage system according to claim 3, wherein the first storage device is configured to:
manage the specified address, mapping information indicating a correlation between the specified address and an address of a storage medium in the first storage device at which data on the specified address is stored, and an address of the storage medium in the first storage device at which the old data is stored;
store the new data at an address in the storage medium of the first storage device different to that of the old data;
update an address corresponding to the specified address to an address of the new data in the mapping information; and
writeback the address corresponding to the specified address with an address of the old data in the mapping information in response to the reset command.

5. The storage system according to claim 1, wherein:
the first storage device stores the new data at an address different to that of the old data in the storage medium of the first storage device;
the second storage device stores the new parity at an address different to that of the old parity in the storage medium of the second storage device; and
in a case where the write request management information indicates pre-generation of the new parity, the second processor acquires data in stripe columns that contain the new data from the plurality of storage devices to generate a parity from the acquired data in the stripe columns and store the parity in the second storage device.

6. A method of storing data in a storage system including a controller with a memory area and a plurality of storage devices each including a storage medium, wherein:
the controller receives a write request from a host, wherein the controller includes a plurality of processors;
a first processor in the plurality of processors is configured to start processing the write request and store write request management information indicating a processing phase of the write request in a shared storage area using the plurality of processors;
a second processor in the plurality of processors is configured to take over processing of the write request in response to an error in the first processor and refer to the write request management information in the shared storage area to identify a phase of processing of the write request;
the controller sends an intermediate parity generation command corresponding to a specified address indicated by the write request to a first storage device in the plurality of storage devices;
the intermediate parity generation command instructs generation of an intermediate parity from new data of the specified address and old data that is updated to the new data;
the intermediate parity generation command includes a first address of the memory area that stores the new data and a second address of the memory area for storing the intermediate parity; and
the first storage device receives the intermediate parity generation command, acquires the new data from the first address, generates the intermediate parity from the new data and the old data stored in the first storage device, and stores the intermediate parity at the second address.

7. The method according to claim 6, wherein:
the controller sends a new parity generation command to a second storage device in the plurality of storage devices;

the new parity generation command instructs generation of a new parity from the intermediate parity and an old parity related to old data at the specified address;

the new parity generation command includes a second address; and the second storage device receives the new parity generation command, reads out the intermediate parity from the second address, and generates the new parity from the intermediate parity and the old parity stored in the second storage device.

8. The method according to claim 6, wherein, in a case where the write request management information indicates pre-generation of the new parity, the controller sends, to each of the first storage device and the second storage device, a reset command instructing the first storage device and the second storage device to stop processing the intermediate parity generation command and the new parity generation command.

9. The method according to claim 8, wherein the first storage device is configured to:

manage the specified address, mapping information indicating a correlation between the specified address and an address of a storage medium in the first storage device at which data on the specified address is stored, and an address of the storage medium in the first storage device at which the old data is stored;

store the new data at an address in the storage medium of the first storage device that is different to that of the old data;

update an address corresponding to the specified address to an address of the new data in the mapping information; and writeback the address corresponding to the specified address with address of the old data in the mapping information in response to the reset command.

10. The method according to claim 6, wherein:

the first storage device stores the new data at an address different to that of the old data in the storage medium of the first storage device;

the second storage device stores the new parity at an address different to that of the old parity in the storage medium of the second storage device; and in a case where the write request management information indicates pre-generation of the new parity, the second processor acquires data in stripe columns that contain the new data from the plurality of storage devices to generate a parity from the acquired data in stripe columns and store the parity in the second storage device.

* * * * *